UNITED STATES PATENT OFFICE.

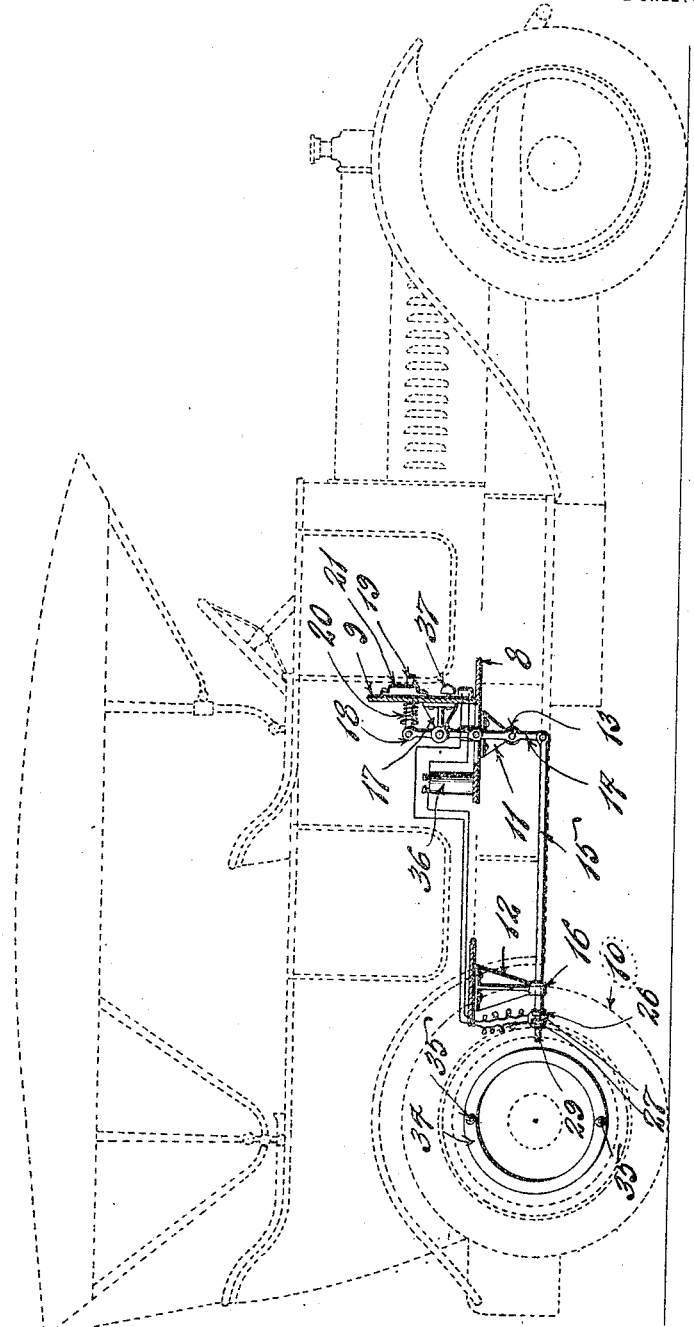

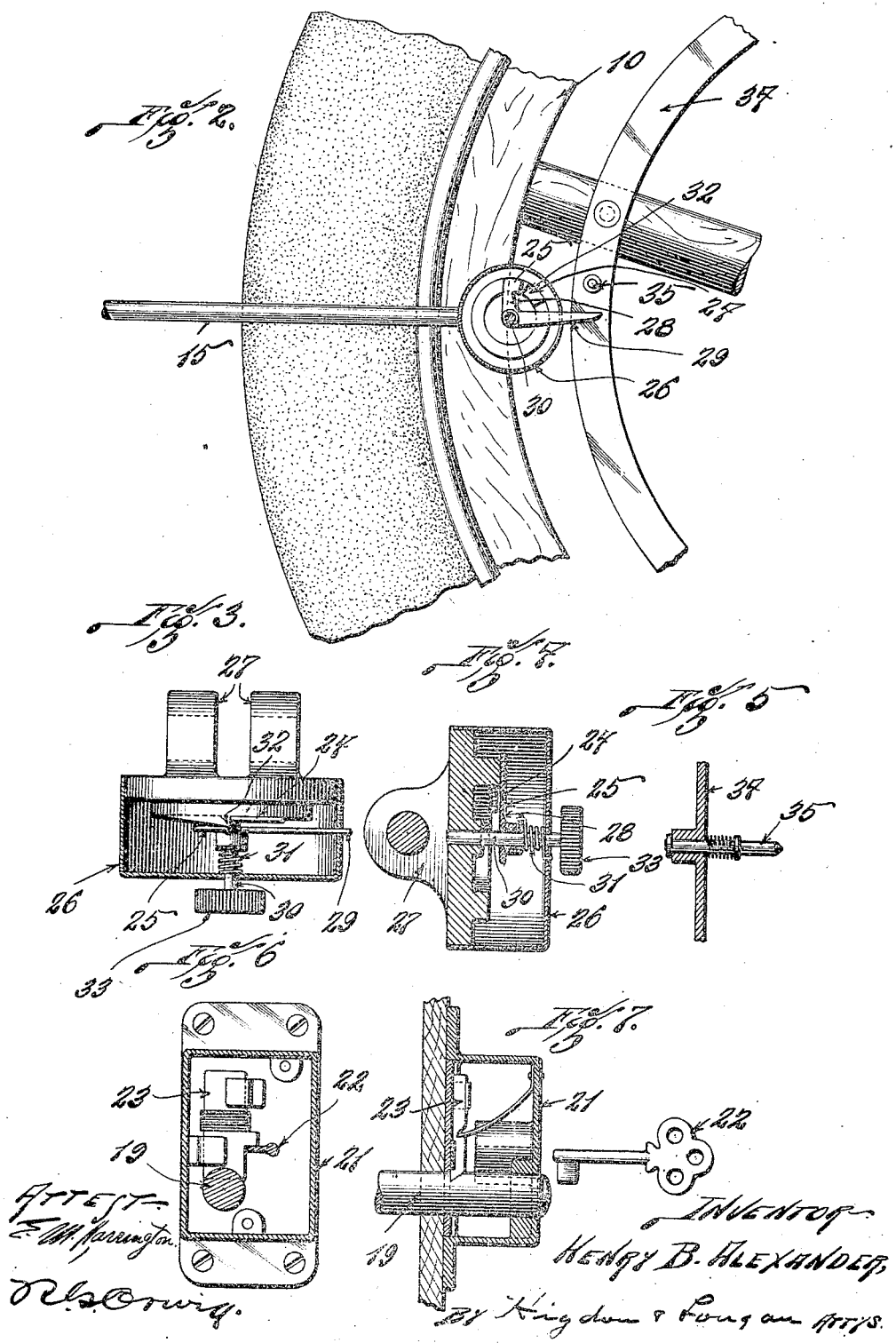

HENRY B. ALEXANDER, OF ST. LOUIS, MISSOURI.

AUTOMOBILE-THEFT ALARM.

1,199,226.  Specification of Letters Patent.  Patented Sept. 26, 1916.

Application filed September 11, 1914. Serial No. 861,219.

*To all whom it may concern:*

Be it known that I, HENRY B. ALEXANDER, a citizen of the United States, and resident of St. Louis, Missouri, have invented certain new and useful Improvements in Automobile-Theft Alarms, of which the following is a specification containing a full, clear, and exact description, reference being had to the accompanying drawings, forming a part hereof.

My invention relates to improvements in automobile theft alarms, and the object of my invention is to construct a simple means, arranged to be installed on a vehicle, such as an automobile, which will sound an alarm when the vehicle is set in motion by an unauthorized person.

With the above object in view, my invention consists in certain novel details of construction and arrangement of parts, hereinafter fully described, pointed out in my claim, and illustrated by the accompanying drawings, in which:—

Figure 1 is a diagrammatical elevation of the alarm, the parts of which being arranged for use on an automobile, which is shown in dotted lines; Fig. 2 is a fragmental elevation, partly in section, showing the movable switch in position to be engaged by a point on one of the automobile wheels; Fig. 3 is an enlarged sectional plan of the switch, a portion of the arm being broken away; Fig. 4 is a vertical, sectional elevation of the switch; Fig. 5 is an enlarged sectional elevation of the wheel ring showing the spring actuated point for engagement with the switch arm; Fig. 6 is a front sectional elevation of the locking means for holding the switch to its operative position; and Fig. 7 is a vertical sectional elevation of the lock.

Referring by numerals to the accompanying drawings: 8 designates the bottom of the automobile body, 9 the riser of the forward or driver's seat, and 10 one of the wheels of the automobile. Secured to and depending from the bottom 8 of the automobile body is a pair of brackets 11 and 12, the bracket 11 terminating in a perforated ear 13 for the pivotal support of a lever 14, which pivotally supports a rod 15 at its forward end, and the bracket 12 terminating in a sleeve 16 which slidably supports the rod 15 at its rear end.

17 designates a bracket secured to the riser 9 of the forward seat of the vehicle arranged for the pivotal support of a lever 18, the lowermost arm of which is pivotally connected with the uppermost arm of the lever 14.

19 designates a push-rod, which is pivotally connected with the uppermost arm of the lever 18 and which is extended through the riser 9, this push-rod being acted upon by a coil spring 20 to normally hold it at its forward limit of movement.

21 designates a lock having a key 22 for the operation of the spring-bolt 23, which serves as a means, when engaging a notch in the push-rod, for holding the push-rod 19 inwardly against the tension of the spring 20.

At the rearmost end of the rod 15 there is a switch, comprising a fixed contact 24, and a movable contact 25, both inclosed in a casing 26 provided with ears 27, whereby the casing may be moved and set at different positions lengthwise of the rod 15 to provide for vehicles of different lengths, the movable contact being carried, as shown, by one arm 28 of a bell crank, the other arm 29 of which extends through a slot in the casing. The bell crank is mounted on a pin 30, and is acted upon by a spring 31 to normally hold the bell crank to its normal position out of engagement with the fixed contact, which spring also serves to hold the two contacts toward each other when registering. To positively hold the movable contact in registration, I provide a shoulder 32 in the path of the movable contact over which it must ride to register with the fixed contact, and away from which the movable contact must be drawn to return to its normal position. The button 33 is provided for the convenient turning or setting of the movable contact, after having been operated, to its "non-ringing" position.

On one of the rear wheels, as shown, I secure to the spokes a ring 34, carrying one or more spring-pins 35, which serve to engage the arm 29 of the bell crank and "set" the switch, when the automobile wheel is turned. The switch is in normally broken circuit with a battery, such as 36, or other source of electrical energy, and a bell, such as 37, or other electrically operated sound producing instrument.

In Fig. 1 the alarm is shown in its normal condition, with the switch out of the path of travel of the pins on the automobile wheel. In order to set the alarm, it is only necessary to push the push-rod rearwardly until it is held by the spring bolt of the lock. This movement of the push rod moves rearwardly the rod carrying the switch to such a position wherein the long arm of the bell crank of the switch will be in the path of the pin on the automobile wheel. When thus set it is obvious that upon a movement of the automobile the pin on the autmobile wheel will engage the long arm of the switch and move the short arm thereof, carrying a movable contact into engagement with a fixed contact, where the movable contact will be held by the shoulder 32, and thus sound an alarm, which will continue until released by the key 22 freeing the spring bolt from the push-rod and allowing the spring 20 to move the rod carrying the switch, to a position wherein the switch is out of the path of the pins on the wheel.

Having thus described my invention, what I claim as new therein and desire to secure by Letters Patent of the United States therefore is:

An automobile theft alarm comprising an alarm device, an electric circuit including said alarm device, a normally open switch in said circuit, an element arranged upon a movable part of a vehicle, means for mounting said switch permitting bodily movements thereof, means for moving said switch into and out of the path of said element on a movable part of a vehicle and a lock controlling means for the switch moving means.

In testimony whereof, I have signed my name to this specification, in presence of two subscribing witnesses.

HENRY B. ALEXANDER.

Witnesses:
E. L. WALLACE,
EDWARD E. LONGAN.